Figure 1:
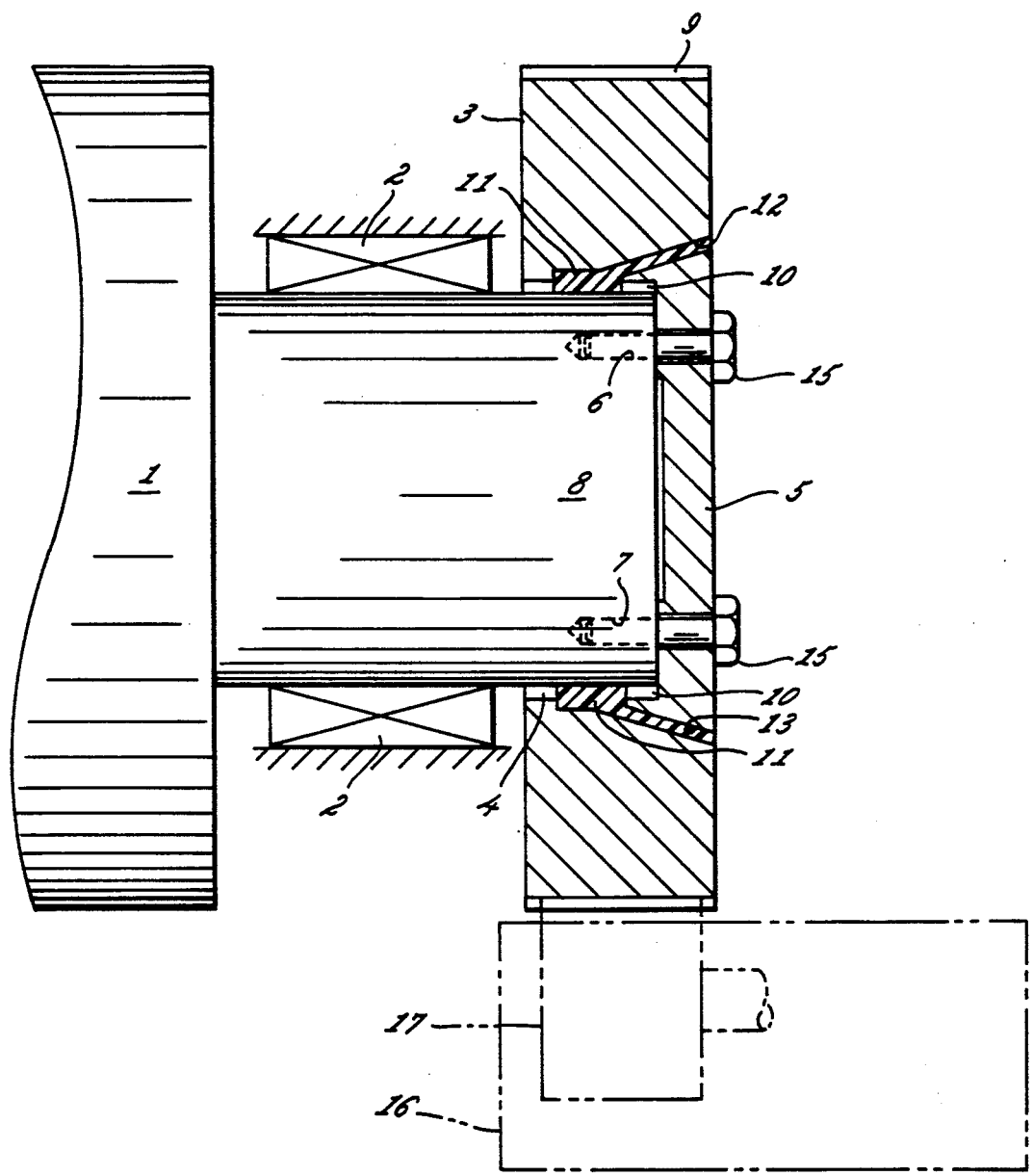

United States Patent [19]

Melzer et al.

[11] Patent Number: 5,142,783
[45] Date of Patent: Sep. 1, 1992

[54] METHOD OF CORRECTING GEAR TOOTH SYSTEM ERRORS

[75] Inventors: Rudolf Melzer, Hainburg; Valentin Gensheimer, Muhlheim/Main, both of Fed. Rep. of Germany

[73] Assignee: MAN Roland Druckmaschinen AG, Fed. Rep. of Germany

[21] Appl. No.: 456,374

[22] Filed: Dec. 26, 1989

[30] Foreign Application Priority Data

Dec. 24, 1988 [DE] Fed. Rep. of Germany ....... 3843955

[51] Int. Cl.⁵ .............................................. B21D 53/28
[52] U.S. Cl. .................................... 29/893.2; 29/407; 264/262; 403/268; 74/443
[58] Field of Search ................. 29/893.2, 407; 74/443; 264/261, 262, 263; 403/260, 265–268

[56] References Cited

U.S. PATENT DOCUMENTS

| | | | |
|---|---|---|---|
| 3,381,548 | 5/1968 | Wolkenstein | 29/893.2 |
| 4,074,583 | 2/1978 | Hansson | 29/893.2 |
| 4,790,971 | 12/1988 | Brown et al. | 264/262 |
| 4,869,603 | 9/1989 | Melzer et al. | 264/262 |

FOREIGN PATENT DOCUMENTS

| | | |
|---|---|---|
| 2557701 | 11/1983 | Fed. Rep. of Germany . |
| 3726233 | 8/1988 | Fed. Rep. of Germany . |
| 641538 | 2/1984 | Switzerland . |

*Primary Examiner*—P. W. Echols
*Attorney, Agent, or Firm*—Leydig, Voit & Mayer

[57] ABSTRACT

A method of correcting tooth system errors in a gear pairing in which one of the gears is mounted on a component to be driven. The mounted gear is first non-positively supported on the shaft of the component to be driven with a relatively small clearance between the gear and shaft, the error in the angle of gear rotation then is measured by a separate measuring facility in a single-flank rolling test, and the gear is radially displaced to correct for the error in the angle of rotation. The gear then is positively connected to the shaft without clearance between the gear and shaft by a plastic layer interposed between the shaft and an annular groove in the mounting bore of the gear.

9 Claims, 2 Drawing Sheets

METHOD OF CORRECTING GEAR TOOTH SYSTEM ERRORS

DESCRIPTION OF THE INVENTION

The present invention relates generally to gear transmissions, and more particularly, to a method of correcting gear tooth system errors in a gear pairing by means of pitch circle displacement and to the corrected gear mounting arrangement.

The tooth systems of ordinary spur gear transmissions produce vibrations in operation due to tooth system errors arising in manufacture. The errors include out-of-roundness of the gear teeth, displacement of the gear axis, and other inaccuracies arising from the mounting of the particular transmission part. These problems become very noticeable in printing presses when, for example, the printing press sheet-conveying drums each have two transfer positions. A gear which is used in this transmission, typically known as a double-size gear, will have different tolerances or manufacturing errors in the tooth system for each of the two transfer positions. These errors lead to different transfer positions of the associated conveying drum. It then becomes impossible to ensure a uniform print quality since there is often a rhythmic displacement of the printings from sheet to sheet.

One method and apparatus for compensating for errors of gear rotation in gear transmissions in a printing press drive is shown in German patent DE-OS 3 726 253. Such method and apparatus corrects shaft oscillations, based upon errors in the angle of gear rotation as determined by a separate measuring facility. In processing the measured value, the amount and phase of the error in angle of rotation of the shaft are found, whereafter compensation is effected by radial adjustment of the gear to correct for the error. To this end, a toothed ring adapted to be shifted radially by a calculated amount is disposed on the shaft. This method, however, is relatively complicated and time consuming. Basically, all of the vibrations arriving from the drive line at a drive station in the press are detected and indicated as the errors at one place. As a result, the entire transmission must first be completely assembled before the corrections can be made. Accordingly, the need has existed for a simpler method of correcting gear tooth system errors.

It is an object of the present invention to provide a method of compensating for errors in the angle of gear rotation which can be employed in a relatively simple manner during assembly of a gear train.

Figure 2:
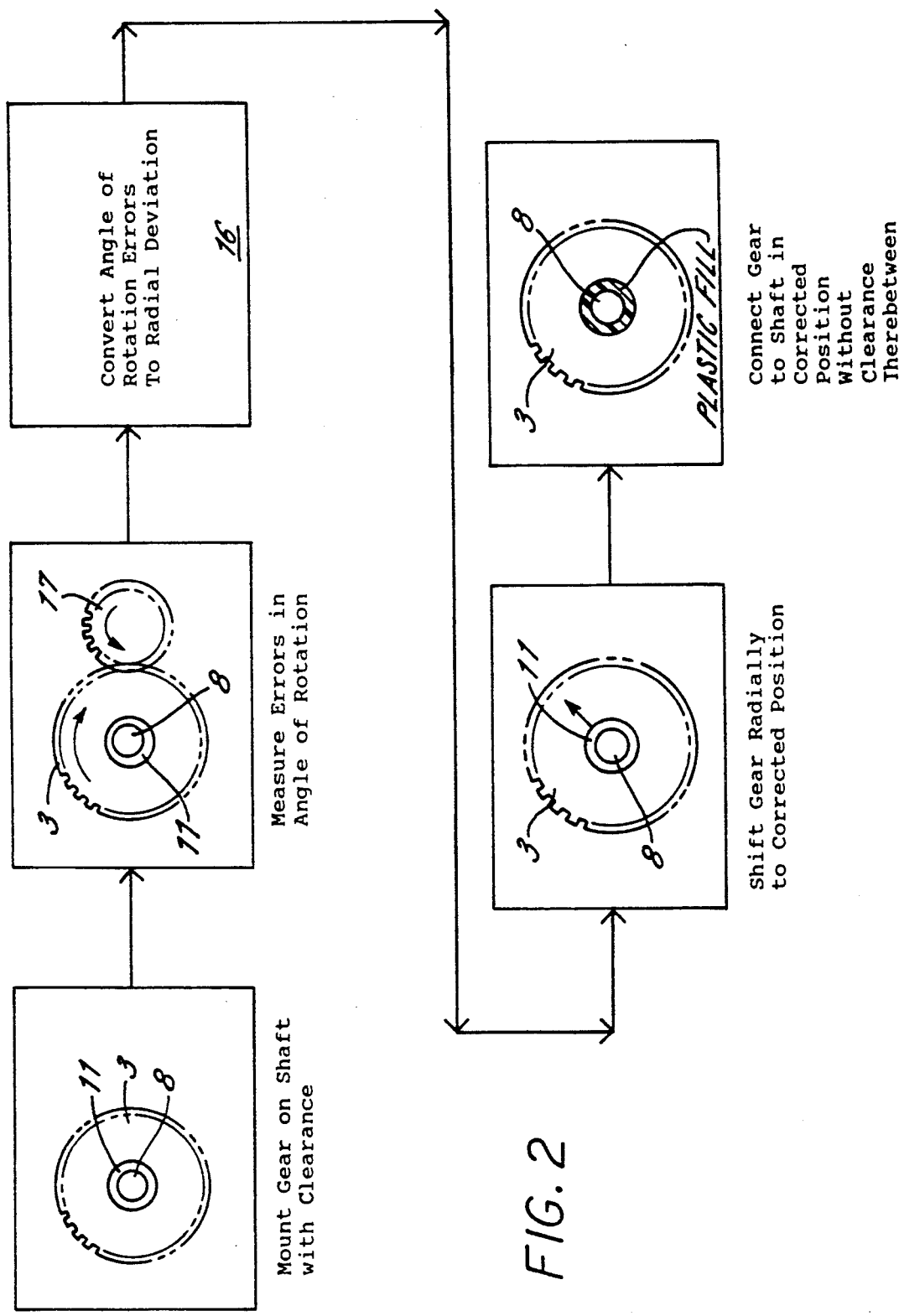

Other objects and advantages of the invention will become apparent upon reading the following detailed description of a preferred embodiment of the invention and upon reference to the accompanying drawing, wherein:

FIG. 1 is a partially diagrammatic illustration of a gear driven impression component of a printing press, illustrating the method of the present invention and showing a corrected gear tooth system, and FIG. 2 is a diagrammatic depiction of the steps of the method of the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to the drawing, there is shown a gear driven component, such as an impression cylinder 1 or a sheet-conveying drum of a printing press. The cylinder 1 in this instance has a journal or shaft 8 extending outwardly from one end thereof, which is supported by a bearing 2. The journal 8 in turn carries a driven gear 3 at an outermost end thereof.

The gear 3 is formed with a bore 4 which has a small clearance 10 relative to the journal 8 of the cylinder 1. The clearance 10 is shown in exaggerated fashion in the drawing for purposes of illustration. The bore 4 in this case extends only partially through the gear, leaving an end wall 5 immediately adjacent an end face of the journal 8. The bearing end wall 5 and the adjacent end of the journal 8 are formed with a plurality of axially aligned bores 6, 7, respectively, to permit securement of the gear to the journal by threaded screws 15, as will become apparent. As will be understood, the gear 3 may be appropriately driven by a mating gear of the press for rotating the cylinder 1.

Because of eccentricities of the journal 8, out-of-roundness of the bearing 2, and manufacturing inaccuracies in the tooth system 9 of the gear 3, the gear 3 may not mesh properly with its mating gear, nor optimally drive the cylinder 1. As is known in the art, as disclosed in the aforesaid German patent DE-OS 3 726 233 and diagrammatically depicted in FIG. 2, variations in the angle of rotation of the driven gear 3 resulting from such inaccuracies may be determined by a separate conventional measuring facility adapted for determining radial deviations in the tooth system in a single flank rolling est.

For purposes herein, as will be understood by one skilled in the art, single flank rolling test is a test in which two gear wheels are rotated with either right or left flanks of respective teeth of the gear wheels in engagement with one another under prescribed axial spacing of the gear wheels, wherein the flanks remain in constant engagement. Generally, a work piece is mounted on a gauged gear wheel. Deviations from a fault-free or optimum rotation of the gear are measured. Such deviations can be measured in terms of angle, or distance along the circumference of a circle. For measuring these deviations, the test apparatus includes comparator means which realizes or simulates the gear movement from the optimum. Such comparator means may be mechanical, electrical, optical or a combination of such means.

For purposes herein, as also understood in the art, radial deviations in the tooth system is a radial deviation from the true gear rotation caused by eccentricity of the gearing in a plane perpendicular to the gear axis, a nonuniformity of the gear gap width which arises through a nonuniformity of the graduation of the right and left flanks, or a deviation caused by a skewed position of the gearing axis. It will be further understood that angle of rotation, as used herein, is the measured angle of rotational gear movement during the test. The unit comprising the cylinder 1, bearing 2 and gear 3 is supported by way of the bearing 2 in parallel relation to a shaft of a measuring facility 16 on which a measuring gear or wheel 17 is mounted. An auxiliary drive may rotate the unit slowly, with the measuring gear 17 disposed parallel to the mounting of the cylinder 1 in engagement with the gear 3 to be aligned. Sensors of angular rotation coupled with measuring devices for performing a single-flank rolling test are disposed on the measuring gear 17 of the facility 16 and on the gear 3. The two co-rotating gears are maintained in contact in each case by way of a single flank of the gear teeth and are rolled relative to one another for at least one complete revolution. The angle of rotation sensors record how the two meshing parts have rolled relative to one another, with variations in the angle of rotation being recorded. The deviation in the angle of rotation between the measuring wheel and the unit comprising the cylinder 1, bearing 2 and gear 3 will include eccentricities of the journal 8, out-of-roundness of the bearings 2, and manufacturing inaccuracies in the teeth system 9 of the gear 3. The total error will be recorded, and from this error in the angle of rotation, the radial deviation or adjustment in the position of the gear 3 may be determined in order to compensate for such error.

In accordance with the present invention, the driven gear is shifted radially with respect to the journal upon which it is supported so that the radial deviation of the tooth system from the ideal position is substantially eliminated and the gear is then positively connected to the journal in such corrected position without clearance between the gear and journal. In the illustrated embodiment, the gear 3 is displaced relative to the journal 8 to compensate for the total error in the angle of rotation so that an optimum fit is produced between the gear 3 and the cylinder 1, the deviations in the angle of rotation being substantially eliminated. The gear 3 may be temporarily secured in such position by the clamping screws 15.

For positively securing the gear 3 to the journal 8 in the corrected position, the bore 4 of the gear 3 is formed with a relatively shallow angular groove 11 located centrally within the bore 4. The groove 11 preferably covers approximately 65 to 80 percent of the length of the bore 4 and is approximately 1 to 2 mm. in depth so that the diameter of the groove 11 is between 2 to 4 mm. greater than the diameter of the bore 4. The remaining portions of the bore 4 on opposite sides of the groove 11 provide guidance of the gear 3 into mounted position during preliminary assembly.

In carrying out the invention, the gear is positively supported on the journal without clearance by means of plastic material injected into the groove 11 about the perimeter of the journal 8. To permit injection of plastic into the groove 11, the gear is formed with a feed bore 12 communicating with the groove 11 and, at a location 180° offset therefrom, a venting bore 13 is formed in communication with the groove 11. The groove 11 may be filled with fluid plastic, such as SK C 60, which cures to provide a positive support for the gear. Such plastic composition may be introduced under pressure through the feed bore 12 until it emerges from the bore 13. The plastic composition will then be present throughout the groove 11 and is prevented from flowing outwardly of the groove by the narrowness of the clearance 10 between the bore 4 and journal 8. The seat of the gear 3 on the journal 8 is then completely without clearance at the central location of the connection between the mounting bore 4 of the gear 3 and the journal 8. Nothing further needs to be altered in the tooth system for the gear 3 to correct for the prior positional errors.

It will be appreciated by one skilled in the art that as a result of such corrected mounting of the drive gear 3, enhanced printing results may be achieved. Moreover, such corrected positioning of the gear can be more economically and quickly effected during assembly of the drive transmission. The gear alignment also can be effected individually for each machine pair. While the method of measuring the errors and the manner of effecting the non-positive and positive connection of the gear 3 to the journal may be varied, in each case, the gear preferably should be secured to the journal without clearance in a position that provides optimum compensation of the total tolerance of all of the positional and manufacturing errors of the driven unit. Alternatively, measurement of the surface of the cylinder could be used for comparative purposes. Adjustment would then be by way of optimal alignment of the pitch circle of the tooth system 9 relative to the surface shape of the cylinder 1.

From the foregoing it is seen that the method of the present invention compensates for errors in the angel of gear rotation and can be employed in a relatively simple manner during assembly of a gear train.

I claim as my invention:

1. A method of correcting tooth system errors in a gear pairing in which one of the gears is mounted on a shaft of the compartment to be driven comprising
   mounting said one gear of the pairing on the shaft of the component to be driven with a relatively small radial clearance between the gear and shaft,
   rotating said one gear, shaft and component after said gear is mounted thereon and measuring by a separate measuring facility in a single-flank rolling test the errors in the angle of rotation,
   converting the determined errors in said angle of rotation into radial deviations in the tooth system of said one gear,
   shifting said one gear radially with respect to said shaft to a corrected position to compensate for the determined radial deviations, and
   connecting said one gear to said shaft in said corrected position without radial clearance between said one gear and shaft.

2. The method of claim 1 including connecting said one gear on said shaft by a cured plastic layer interposed between the bore of said gear and said shaft.

3. The method of claim 1 including initially securing said one gear to said shaft by fastening screws, and then connecting and supporting said one gear on said shaft by a cured plastic layer interposed between the bore of said gear and said shaft.

4. The method of claim 3 in which said one gear is temporarily secured to said shaft by fastening screws extending through an end of said one gear into an end of said shaft.

5. The method of claim 2 including forming said one gear with a bore slightly larger than the diameter of said shaft for defining said relatively small clearance between said one gear and shaft, forming a groove in said bore along a central portion thereof, and filling said groove with said plastic.

6. The method of claim 5 in which said groove is filled with plastic by directing plastic through a supply bore extending through an end of said one gear in communication with said groove.

7. The method of claim 6 including filling said groove by directing plastic through said supply bore, about said groove, and out a venting bore communicating with said groove and extending through an end of said one gear in 180° offset relation to said supply bore.

8. The method of claim 5 including forming said groove over about 60%–85% of the length of said bore.

9. The method of claim 8 including forming said groove with a diameter of between about 2–4 mm. larger than the diameter of said bore.

* * * * *